March 17, 1925.　　　　　　　　　　　　　　　　　　　　　　　1,529,806
P. G. OETTEL
MATCH BLOCK SAWING MACHINE
Filed Jan. 12, 1924　　　　2 Sheets-Sheet 2
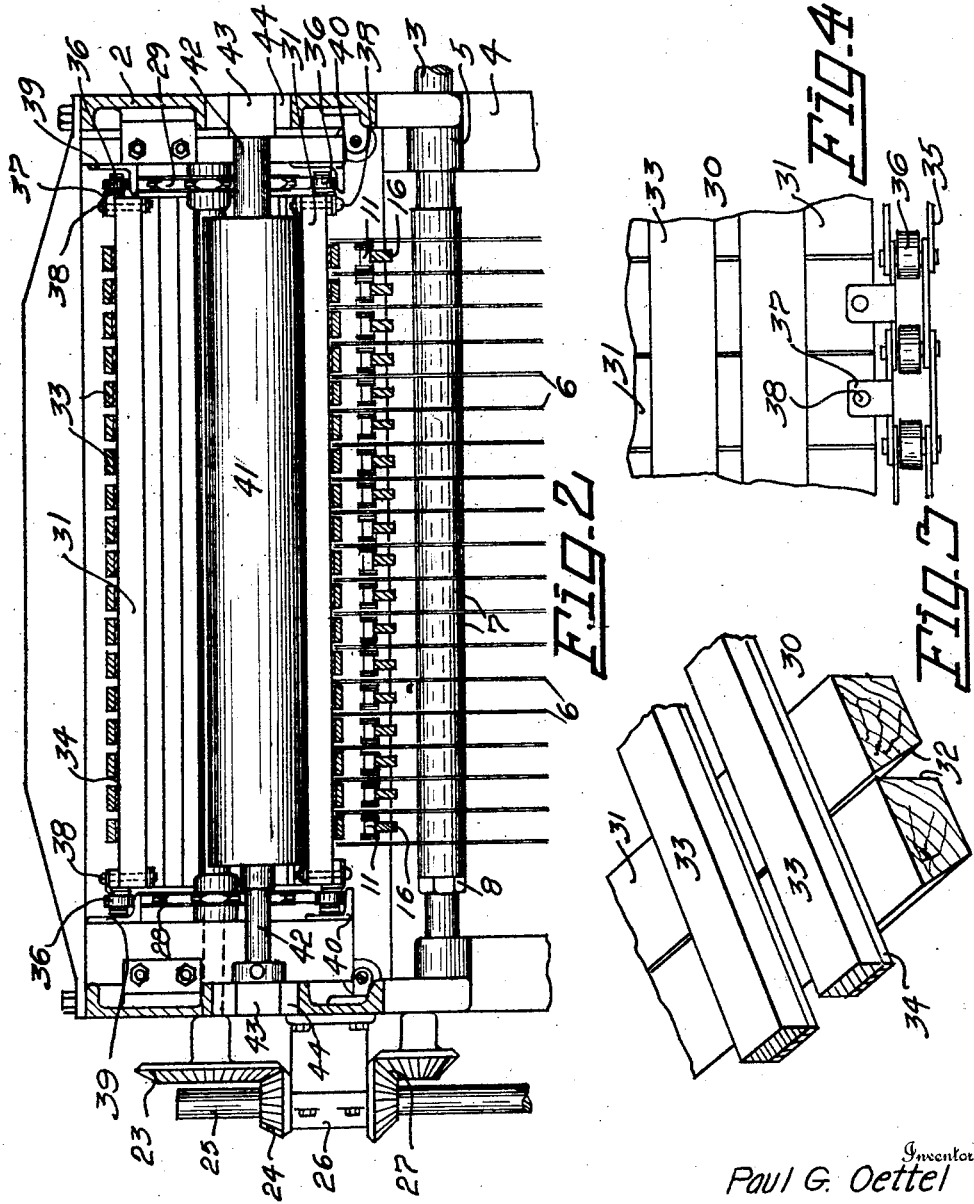
Inventor
Paul G. Oettel
By Herbert E. Smith
Attorney Patented Mar. 17, 1925.

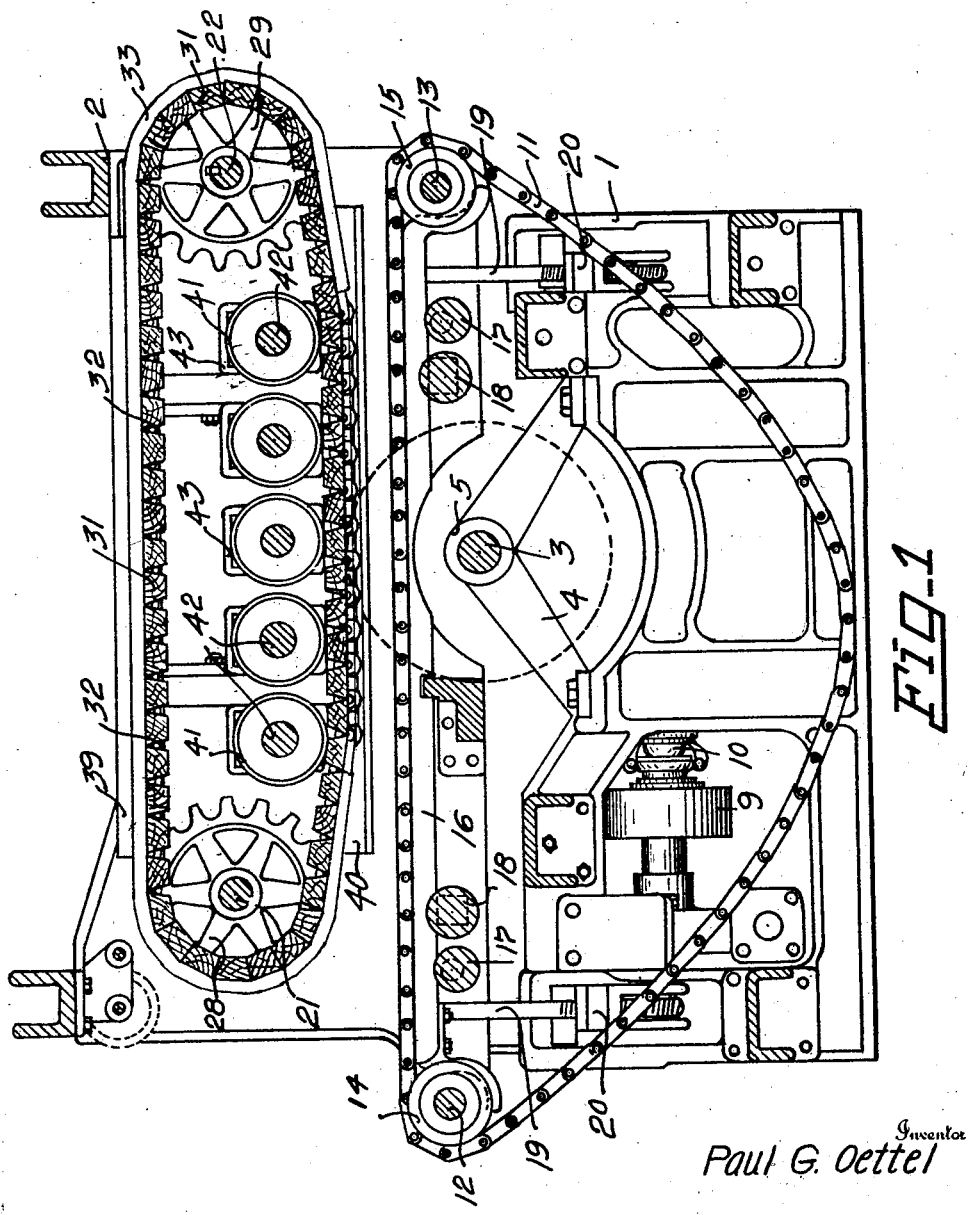

1,529,806

UNITED STATES PATENT OFFICE.

PAUL G. OETTEL, OF SPOKANE, WASHINGTON.

MATCH-BLOCK-SAWING MACHINE.

Application filed January 12, 1924. Serial No. 685,785.

*To all whom it may concern:*

Be it known that I, PAUL G. OETTEL, a citizen of the United States, residing at Spokane, in Spokane County, and State of Washington, have invented certain new and useful Improvements in Match-Block-Sawing Machines, of which the following is a specification.

My present invention relates to improvements in match block sawing machines of the gang type wherein the planks to be sawed into blocks are fed to the row of rotary saws and conveyed therefrom transversely of the machine and parallel with the axis of the single saw arbor carrying the saws. The invention is directed particularly to the head portion of the sawing machine which co-acts with a lower series of parallel endless chains moving longitudinally of the machine and on which the planks are carried. The primary object of the invention is the provision of means for applying pressure to the top surfaces of the planks between the spaced saws which pressure shall be continuous from the front to the rear of the machine in order that the planks before being sawed and the blocks after being fashioned may be retained in the feeding mechanism with a continuous, uniform and effective pressure. In this manner the planks are rigidly held in position as they are fed to the saws and as they pass through the saw-gang, and the blocks in addition to being held rigid and conveyed from the saw, are prevented from kicking-back action as they emerge from the sawing operation.

In carrying out my invention I utilize in combination with the lower series of feed chains or other feed devices, a comparatively wide, flexible belt having thereon friction strips disposed longitudinally of the machine and transversely of the planks and passing between the spaced saws, together with other combinations and arrangements of parts as will hereinafter be more fully explained.

In the accompanying drawings I have illustrated one complete example of the physical embodiment of my invention wherein the parts are combined and arranged in accordance with the best mode I have thus far devised for the practical application of the principles of my invention.

Figure 1 is a vertical, longitudinal sectional view of a sawing machine embodying my invention.

Figure 2 is a transverse vertical sectional view at the upper or head portion of the machine of Figure 1 some parts being omitted as unessential, for a proper showing of the invention.

Figure 3 is an enlarged detail perspective view showing a portion of the flexible conveyer belt or feed belt and its friction strips.

Figure 4 is a detail plan view of a portion of the flexible feed belt illustrating its supporting and guide rollers.

The machine frame preferably comprises a base member 1 and a vertically movable upper frame section 2, and in the base section of the frame the arbor 3 extends transversely of the machine and is journaled in struts 4 and bearings 5. The rotary saws 6 are secured on the arbor with spacing collars 7 therebetween which are interchangeable as to size or width to permit adjustment of the saws for variations in the sizes of match blocks to be cut, and a locking nut 8 is employed to retain the saws in rigid relation to the arbor.

In Figure 1 a pulley 9 and clutch device 10 are illustrated from which proper connections are made to drive the arbor 3 for rotating the saws as the planks are fed to them.

The planks are disposed transversely of the machine and fed successively to the saws on the series of longitudinally extending feed chains 11, the working flights of which pass between adjoining saws and are suspended between the driving shaft 12 and shaft 13 on the sprockets 14 and 15 of these respective shafts, and the longitudinally disposed guide bars 16 located between adjacent saws support these working flights of the lower feed chains for the planks.

Transverse bars 17 and 18, arranged in pairs and located beneath the guide bars 16 are adapted to support the latter in level and adjusted position for the support of the chains passing over them.

The upper frame section 2 may be elevated for the purpose of gaining access to the saws for replacement and re-adjustment through the instrumentality of screw bars 19 that are movable in the stationary nuts 20 of the lower frame.

The upper frame section 2 supports the head of the feeding device for the planks, which head includes a pair of transversely arranged, spaced shafts 21 and 22, journaled in the frame, and the driving shaft 21 at its end is provided with a bevel gear 23 that is driven from the bevel pinion 24 on the upright shaft 25 supported and journaled in bearings as 26. A gear-couple 27 is also employed in connection with shaft 25 and sprocket shaft 12 for operating the latter.

Each shaft 21 and 22 has a pair of sprocket wheels as 28 and 29 keyed thereto, upon which the flexible belt indicated as a whole by the numeral 30 is supported. This belt co-acts with the lower feed chains 11 and is of sufficient width to extend across the interior of the machine and cover the length of the planks as they are presented to the saws and to retain them in their passage.

The body of the flexible belt is composed of slats 31 extending transversely of the machine and fashioned with beveled sides 32 in order that V-shaped spaces may be formed between the slats to compensate for contraction of the belt as it passes around the end supports or sprocket wheels. The slats are tapered in cross section with their maximum width at the exterior face of the belt and their minimum width at the interior of the belt so that the exterior face of the belt is a smooth continuous surface while the interior face is interrupted by transverse grooves for the purpose described.

On the exterior face of the belt and extending longitudinally of the machine and in the direction of travel of the planks are arranged continuous, spaced, parallel friction strips 33 which may be of rubber or other similar cushioning material, and a backing strip 34 may be utilized if desired, each endless strip being secured to the slats at the exterior of the belt. These strips, as the belt travels, are arranged in position complementary to and alined with the series of feed chains 11 and the strips as seen in Figure 2 pass between adjoining saws, in close frictional contact with the transversely arranged planks from which the blocks are to be cut. Thus that portion of the plank that is to be cut into a block as it passes between adjoining saws is retained in rigid position by means of the strip 33 bearing down on the plank as it is supported and conveyed by the feed chain 11, and the block is also retained for the required length of time to prevent the undesirable kick-back from the saws.

The feed chains 11 are inflexible, but the upper flight belt made up of the slats and the flexible friction strips 33 bearing upon the planks compensate for any inequalities or irregularities in the planks and insure a continuous and rigid retention of the planks as they are fed to the saws and as the blocks pass from the saws.

The upper and lower flights of the flexible belt are supported in their travels and the belt is directly actuated by means of a pair of sprocket chains 35, one at each side of the belt, which chains pass over the sprocket wheels 28 and 29. The chains are provided with supporting rollers 36 journaled in the links and on the pins of the chains and each link of the chains is attached to a slat as by means of an attaching plate 37, one fixed at each end of the slats as by bolts 38.

The guide and supporting rollers travel in tracks of which the spaced angle irons 39 form the track for the upper flight of the belt and the complementary pair of angle irons 40 form the track for the rollers at the lower or working flight of the belt, the tracks of course extending longitudinally of the machine as indicated, and terminating at a suitable distance from the sprocket wheels 28 and 29.

The downward pressure on the friction strips 33 to hold them in close contact with the planks is furnished through the slats of the working flight of the belt by means of a series of uniformly spaced roller weights of gravity bearing rollers 41 beneath which the inner face of the endless flexible belt 30 passes and upon which face the rollers are supported.

Each gravity roller is provided with a shaft 42 having at its ends bearing blocks or journal blocks 43, and these journal blocks are vertically movable in the guide ways or slots 44 of the frame section 2. The rollers 41 are of a predetermined weight for imposing the required load on the working flight of the flexible belt, and due to gravity the weight of the rollers is imposed on the working flight of the flexible belt and on the planks as described.

In operation it will be apparent that when the planks are fed in their proper initial position in a direction perpendicular to the grain of the wood in the planks with relation to the gang saw, this position of the planks will be maintained throughout the passage of the match stock and match blocks from one end to the other of the machine. The gravity rollers automatically impose the required pressure on the friction strips while in contact with the planks to hold them stable and rigid on the feed chains, and the blocks are fashioned in quantities with uniformity and regularity in shape.

Having thus fully described my invention, what I claim as new and desire to secure by Letters Patent is—

1. The combination in a gang saw machine with a series of spaced parallel feed chains for supporting planks disposed transversely thereof, of a flexible belt supported above said series of chains and operating means therefor, spaced friction strips on the exterior of said belt complementary to the feed chains for engaging the planks, and means for imposing a weight on the working flight of said belt.

2. The combination in a gang sawing machine with a series of spaced, parallel feed devices for supporting planks thereon, of a flexible belt supported above said feed devices, means for actuating said belt and feed devices, spaced friction strips on the exterior of the belt complementary to said feed devices for engaging a plank, and gravity actuated pressure rollers for imposing a weight on the working flight of the belt.

3. In a gang saw machine a work feeding head comprising a flexible belt and driving means therefor and continuous friction strips on the exterior of said belt extending in the direction of travel of the work.

4. In a gang sawing machine a work feeding head comprising a flexible belt composed of slats and driving means therefor continuous friction strips on the exterior of said belt, a sprocket chain operatively connected with said belt and sprocket wheels for supporting said belt and chain.

5. In a gang sawing machine a work-feeding head comprising a flexible belt composed of slats and side chains thereon, supporting sprockets for said chains, said slats having V-shaped grooves therebetween, and spaced friction strips secured on the exterior of said belt.

6. In a gang sawing machine a work feeding head comprising a flexible belt of slats and side chains and sprocket wheels for said chains, said belt having V-shaped grooves between its slats, spaced friction strips secured to the exterior of the belt, and means imposing weight on the working flight of the belt for holding said strips in operative position with relation to the work.

7. In a gang sawing machine a work feeding head comprising a flexible belt and driving means therefor, spaced friction strips on the exterior of said belt, and gravity rollers at the inner side of the working flight of the belt for imposing a weight thereon to hold said strips in operative relation to the work.

8. In a gang sawing machine the combination with a supporting frame having a pair of upper and a pair of lower tracks, of a pair of shafts and sprocket wheels thereon, a flexible belt composed of slats and having side chains for co-action with said sprockets, guide rollers carried by said chains for co-action with said tracks, spaced friction strips on the exterior of said belt, and gravity actuated rollers supported in said frame for imposing weight on the working flight of said belt.

In testimony whereof I affix my signature.

PAUL G. OETTEL.